UNITED STATES PATENT OFFICE.

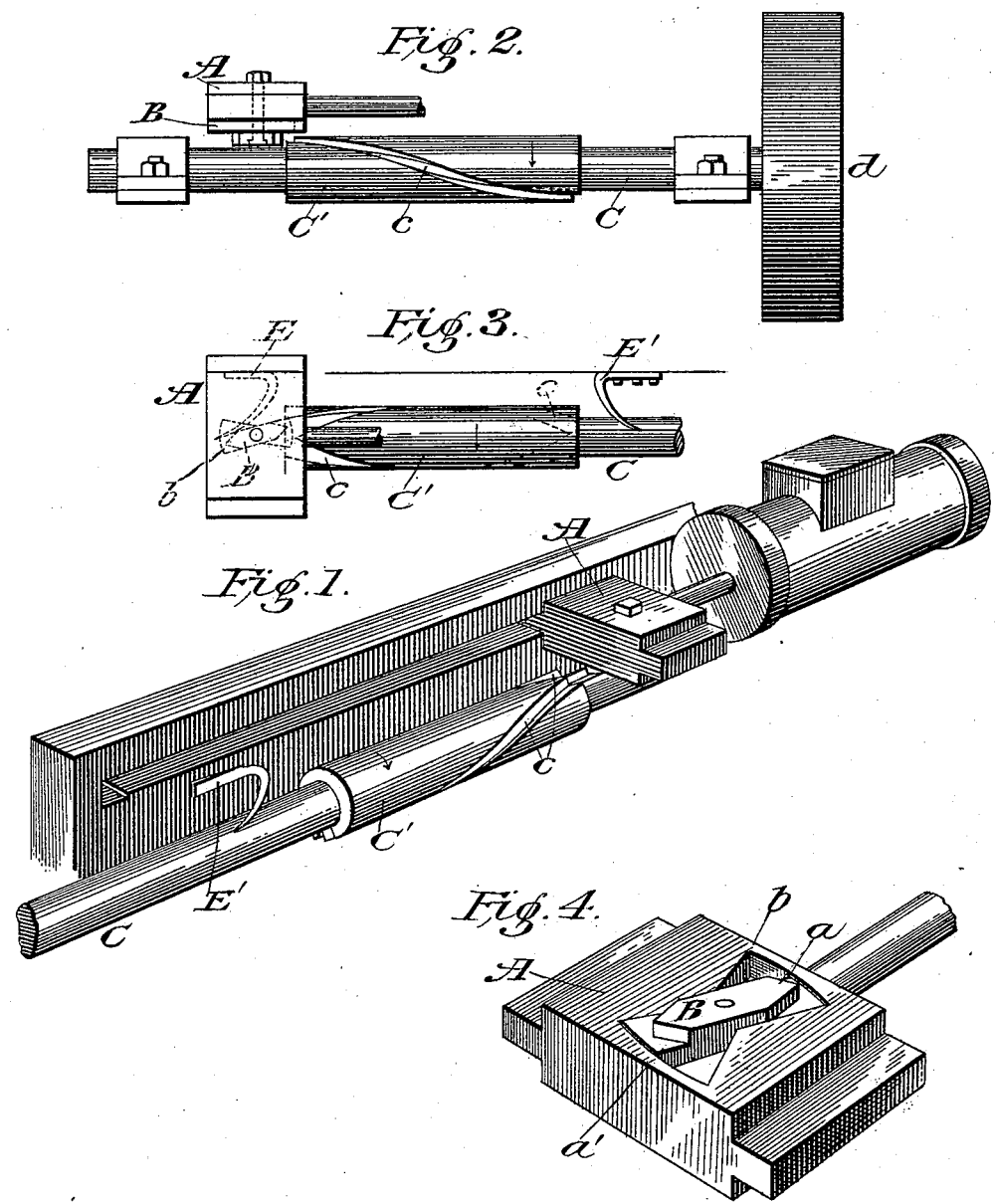

JOHN DE MONNIN, OF CORVALLIS, OREGON, ASSIGNOR OF ONE-HALF TO JOHN R. BRYSON, OF SAME PLACE.

MECHANISM FOR CONVERTING MOTION.

SPECIFICATION forming part of Letters Patent No. 396,147, dated January 15, 1889.

Application filed May 4, 1888. Serial No. 272,801. (No model.)

*To all whom it may concern:*

Be it known that I, JOHN DE MONNIN, a citizen of the United States, residing at Corvallis, in the county of Benton and State of Oregon, have invented a new and useful Improvement in Mechanism for Converting Motion, of which the following is a full, clear, and exact specification, reference being had to the accompanying drawings, in which—

Figure 1 is a perspective view, with parts broken away, of mechanism embodying my invention. Fig. 2 is a side elevation of the same, including a wheel upon the rotary shaft; and Figs. 3 and 4 are detailed views, one being enlarged, of the same.

This invention contemplates certain improvements in mechanism for converting motion—a rectilinear motion into a rotary motion—being specially designed for application to a steam-engine, while it is capable of use in other relations; and to these ends the nature of the invention consists of the sundry combination of parts, substantially as hereinafter more fully set forth, and pointed out in the claims.

As one form of carrying out my invention, I apply to the cross-head A of the piston-rod of a steam-engine, for instance, a cam or lever, B, which is preferably of the construction shown, being rectangular in its general form and having a lower portion, a, provided with double-beveled ends, while its upper longer portion is extended beyond the lower shorter portion and set into and pivoted in a recess, b, in the cross-head A. The recess b is flared from its center toward each end to permit of the swiveling or pivotal movement of the cam or lever B.

C is a shaft suitably supported in place and provided with a cylinder, C', which may be cast therewith. The cylinder C' is provided with two channels or grooves, c c, traversing the same spirally in the direction of its length, said grooves beginning at a common point at one end of the cylinder upon one side, and terminating at a common point at the other end of the cylinder, upon the diametrically-opposite side thereof. They are flared from the ends, from the base outward at the outer sides, a suitable distance inward to permit of the ready entrance of the cam or lever B thereinto.

E E' are two hook-shaped cams applied or fixed to an adjacent part and disposed so as to act upon and reverse the cam or lever B at the ends of the strokes of the piston. The shaft C carries a wheel, d, at one end to transmit motion through suitable medium to the machinery to be driven.

In the present form of carrying out my invention—*i. e.*, its application to a steam-engine—the use of a crank-pitman, eccentric or connecting rod, and cam is dispensed with, while the invention is available for converting a rectilinear motion into a rotary motion in any relation wherever needed.

In operation it will be observed that as the piston begins its forward stroke one end or point of the swiveled cam or lever B will be deflected or guided by the hook-shaped cam E into one of the grooves or channels c c in the cylinder C' of the shaft C. As the piston continues its forward movement or stroke the cam B will travel in and of course conform in its movement to the outline of said groove or channel, and thus at the end of the stroke of the piston it will have given the cylinder, with the shaft, a semi-rotation. Immediately upon the piston completing its stroke the opposite hook-shaped cam, E', will switch or throw the opposite point or end of the cam B into the other channel or groove of the cylinder, and thus upon the return-stroke of the piston cause the cam B to travel therein and continue to revolve or impart to the cylinder, with its shaft, a second semi-rotation, thus causing it to perform a complete or full rotation at two strokes of the piston, which is repeated for every joint forward and return stroke of the piston, the rectilinear movement of the piston thus transmitting a rotary movement to said cylinder and shaft.

Having thus fully described my invention, what I claim, and desire to secure by Letters Patent, is—

1. The mechanism for converting motion, comprising a swiveled or pivoted cam or lever, in combination with and engaging in opposite directions spiral grooves in a cylinder applied to a shaft, and means consisting of stationary or fixed cams for shifting or switching the pivoted cam, substantially as set forth.

2. In mechanism for converting motion, the combination, with the cross-head of an engine-piston provided with a swiveled or pivoted cam or lever, of a shaft carrying a cylinder provided with spiral grooves or channels, and means consisting of stationary or fixed cams for shifting or switching the said pivoted cam, substantially as set forth.

3. In mechanism for converting motion, the combination, with the piston cross-head carrying the pivoted or swiveled cam or lever, of the shaft carrying the cylinder, provided with grooves or channels spirally traversing the same and converging or meeting at opposite sides and ends thereof, and stationary or fixed cams for shifting or switching the pivoted or swiveled cam or lever, substantially as set forth.

4. In mechanism for converting motion, the combination with the piston cross-head carrying the pivoted or swiveled cam or lever, consisting of a lower smaller portion provided with double beveled or pointed ends, and of an upper larger portion set in a recess in the cross-head, of the shaft carrying a cylinder provided with spiral grooves or channels converging or meeting at opposite sides and ends thereof, and fixed or stationary hook-shaped cams for switching or shifting the swiveled or pivoted cam or lever, substantially as set forth.

JOHN DE MONNIN.

Witnesses:
H. C. LYON,
J. R. BRYSON.